(12) United States Patent
Dunbar (10) Patent No.: US 8,072,883 B2
(45) Date of Patent: Dec. 6, 2011

(54) INTERNET SMALL COMPUTER SYSTEMS INTERFACE (ISCSI) DISTANCE ACCELERATION DEVICE

(75) Inventor: J. Michael Dunbar, Brimfield, MA (US)

(73) Assignee: EMC Corporation, Hopkinton, MA (US)

( * ) Notice: Subject to any disclaimer, the term of this patent is extended or adjusted under 35 U.S.C. 154(b) by 1309 days.

(21) Appl. No.: 11/238,604

(22) Filed: Sep. 29, 2005

(65) Prior Publication Data

US 2007/0088795 A1    Apr. 19, 2007

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |
| H04J 3/16 | (2006.01) |
| H04J 3/22 | (2006.01) |
| H04J 3/24 | (2006.01) |

(52) U.S. Cl. ........................................ 370/231; 370/401
(58) Field of Classification Search ........................ None
See application file for complete search history.

(56) References Cited

U.S. PATENT DOCUMENTS

| | | | |
|---|---|---|---|
| 6,757,767 B1 | 6/2004 | Kelleher | |
| 2003/0016683 A1* | 1/2003 | George et al. | 370/404 |
| 2003/0084209 A1 | 5/2003 | Chadalapaka | |
| 2003/0185154 A1* | 10/2003 | Mullendore et al. | 370/230 |
| 2004/0139244 A1 | 7/2004 | Hufferd | |
| 2005/0120141 A1* | 6/2005 | Zur et al. | 709/249 |
| 2005/0192967 A1* | 9/2005 | Basavaiah et al. | 707/10 |
| 2006/0126520 A1* | 6/2006 | Nambiar et al. | 370/248 |
| 2006/0248292 A1* | 11/2006 | Suresh | 711/154 |

FOREIGN PATENT DOCUMENTS

WO    WO03088580    10/2003

OTHER PUBLICATIONS

D. Kim, S. Jung, and M. Park, An efficient way of iSCSI based Remote Storage Service for Mobile Device using Intermediate Target, Proceedings of The Fifth International Conference in Internet Computing, Jun. 24, 2004, pp. 1-9.*

J. Hufferd, iSCSI: The Universal Storage Connection, Addison-Wesley Professional, Nov. 5, 2002, pp. 1-6.*

(Continued)

*Primary Examiner* — Daniel J Ryman
*Assistant Examiner* — Christopher Crutchfield
(74) *Attorney, Agent, or Firm* — Guerin & Rodriquez, LLP; Michael A. Rodriquez (57) ABSTRACT

An Internet Small Computer Systems Interface (iSCSI) distance acceleration device accelerates data transfers between an iSCSI initiator and an iSCSI target over a network, such as the Internet or a wide area network (WAN). The acceleration device resides in a communication path between the iSCSI initiator and the iSCSI target. The acceleration device receives an iSCSI protocol data unit (PDU) targeted to the iSCSI target by the iSCSI initiator. The acceleration device forwards the iSCSI PDU over the network to the iSCSI target and transmits a response to the iSCSI PDU that anticipates a response to be generated by the iSCSI target upon receiving the iSCSI PDU.

13 Claims, 4 Drawing Sheets

OTHER PUBLICATIONS

D. Kim, M. Ok, and M. Park, An Intermediate Target for Quick-Relay of Remote Storage to Mobile Devices, The 2005 International Conference on Computational Science and Applications, May 12, 2005, pp. 1-11.*

J. Satran, C. Sapuntzakis, M. Chadalapaka and E. Zeidner, RFC 3720, Internet Small Computer Systems Interface (iSCSI), Apr. 2004, pp. 1-258.*

J. J Satran, C. C Sapuntzakis, M. Chadalapaka and E. Zeidner, RFC 3720, Internet Small Computer Systems Interface (iSCSI), Apr. 2004, pp. 1-258.*

Cisco Systems, Data Sheet, CISCO MDS 92161 Multilayer Fabric Switch, 17 pages.

Cisco Systems, Data Sheet, Cisco MDS 9506 Multilayer Director, 9 pages.

Cisco Systems, Brochure, The Cisco® MDS 9500 Series of Multilayer Directors—Layering Intelligent Features onto a High-Performance Core to Provide Uncompromising High Availability, Security, Scalability, and East of Management, 8 pages.

CNT, Product Spec Sheet, UltraNet Edge Storage Router—Model 3000, 10 pages.

McData, Networking the World's Business Data™, McData Eclipse™ 4300, SAN Router, 7 pages.

PCT International Search Report for PCT/US20061035661 dated Apr. 19, 2007; 4 pages.

* cited by examiner

INTERNET SMALL COMPUTER SYSTEMS INTERFACE (ISCSI) DISTANCE ACCELERATION DEVICE

FIELD OF THE INVENTION

The invention relates generally to storage networks. More particularly, the invention relates to accelerating iSCSI data transfers across long distance networks.

BACKGROUND

Internet protocol (IP) networks are ubiquitous in businesses and enterprises and local area networks (LAN) are commonplace. Expertise with LANs and LAN components is also widespread. Many LAN components are readily available in the market and readily deployable, and various high performance LAN components (e.g., 1 Gb/sec) are becoming increasingly available. Internet Small Computer Systems Interface (iSCSI) is an emerging technology capable of capitalizing on these industry conditions to produce high performance storage networks at a relatively low cost in terms of capital expense and human resources. In general, iSCSI is a transport protocol for establishing and managing connections between IP-based storage devices, hosts, and clients. The iSCSI protocol provides a mechanism for encapsulating SCSI commands for transmission over an IP network.

Figure 1:
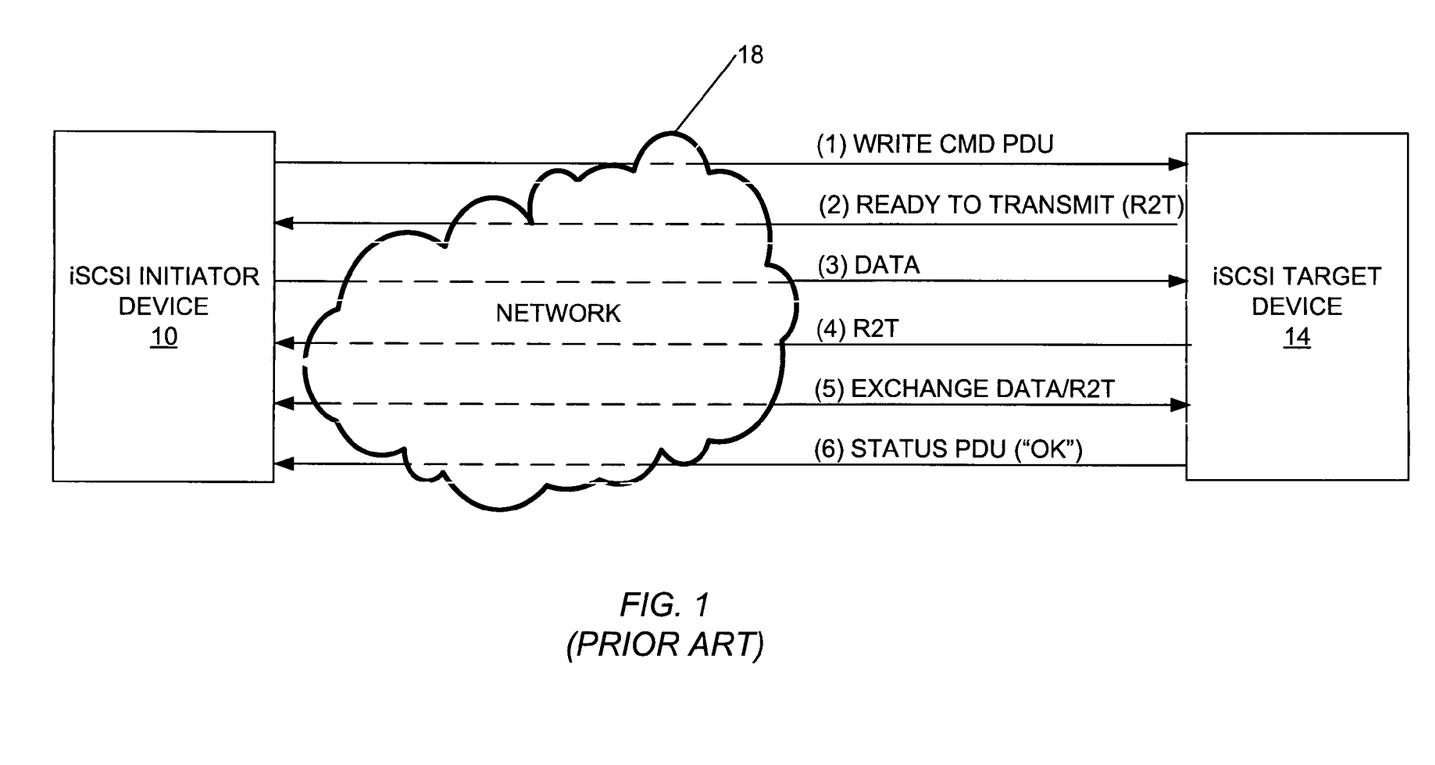
FIG. 1 is a block diagram showing a prior art networking environment that operates according to the iSCSI protocol.

FIG. 1 illustrates a simple example of the iSCSI protocol in operation. In this example, an iSCSI initiator device 10 is attempting to store data at an iSCSI target device 14 across over a network 18. The initiator 10 sends a protocol data unit (PDU) encapsulating a SCSI write command. In reply, the target 14 queues the command, prepares buffers, and sends a PDU encapsulating a ready-to-transmit (R2T) message to the initiator 10. When the initiator 10 receives the R2T PDU, it begins to transmit a data PDU. When the target 14 receives the data, it buffers the data and replies with another R2T message. The initiator 10 and target 14 may exchange additional data and R2T PDUs until the initiator 10 sends the final SCSI data. The target 14 then replies with a Status PDU indicating that the transfer of the data was successful.

Another emerging trend is the implementation of storage networks over Wide Area Networks (WAN) using long distance communication lines. Long distances between initiator and target devices, however, can result in low performance during storage transmission. The cause is latency: the time required for the commands, data, status, and other iSCSI PDUs to complete a round trip between the initiator and the target. Depending upon the distance and the particular communication paths taken by the iSCSI PDUs through the WAN, latency for a single request and response can be in the order of tens to hundreds of milliseconds. In addition, data transfers can involve several request and response transactions, which operate to magnify the overall latency for a full write transaction. Consequently, such latency can be an impediment to the adoption of iSCSI for storage networks implemented across WANs.

SUMMARY

In one aspect, the invention features a method of accelerating data transfers between an Internet Small Computer Systems Interface (iSCSI) initiator and an iSCSI target over a network. An acceleration device in a communication path between the iSCSI initiator and the iSCSI target receives an iSCSI protocol data unit (PDU). The acceleration device forwards the iSCSI PDU over the network to the iSCSI target and generates a response to the iSCSI PDU that anticipates a response to be generated by the iSCSI target when the iSCSI target receives the iSCSI PDU. The response generated by the acceleration device is transmitted to the iSCSI initiator.

In another aspect, the invention features a network device for accelerating data transfers between an Internet Small Computer System Interface (iSCSI) initiator and an iSCSI target over a network. The network device comprises a network interface receiving an iSCSI protocol data unit (PDU) from the iSCSI initiator and forwarding the iSCSI PDU over the network to the iSCSI target. The network device also includes means for generating a response to the iSCSI PDU that anticipates a response to be generated by the iSCSI target when the iSCSI target receives the iSCSI PDU. The generating means is in communication with the network interface for transmitting the response generated by the generating means to the iSCSI initiator.

In still another aspect, the invention features an Internet Protocol (IP)-based network, comprising an Internet Small Computer Systems Interface (iSCSI) initiator sending an ISCSI protocol data unit (PDU) to a remote iSCSI target, and an acceleration device in a communication path between the ISCSI initiator and the iSCSI target. The acceleration device (1) receives and forwards the iSCSI PDU to the iSCSI target, (2) generates a response to the iSCSI PDU that anticipates a response to be generated by the iSCSI target when the iSCSI target receives the iSCSI PDU, and (3) transmits the generated response to the iSCSI initiator.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of the invention mitigate the latency experienced during data transfers between an iSCSI initiator and an iSCSI target remotely separated from the initiator by a long-distance network (e.g., a WAN or the Internet). A distance acceleration device, disposed in a communication path between the initiator and the target, intercepts a request issued by the initiator to perform a write transaction at the target. The initiator's request continues to traverse the network from the distance acceleration device towards the target.

In response to the initiator's request, the distance acceleration device, acting as a proxy for the target, generates and transmits a response to the initiator. The response generated by the distance acceleration device anticipates a response that the target will produce upon receiving the initiator's request. Upon receiving the response from the distance acceleration device, the initiator continues the write transaction as though the target had supplied the response to its request and although the target may not have yet received its request. Thus, the use of the distance acceleration device avoids the round-trip latency associated with transmitting the request and receiving the response. The benefits of reduced latency increase with large write transactions because the distance acceleration device responds more quickly to each transferred data segment than the remote target, and thus induces the initiator to transfer data sooner than if the initiator had to wait for the remote target to reply to each request.

Figure 2:
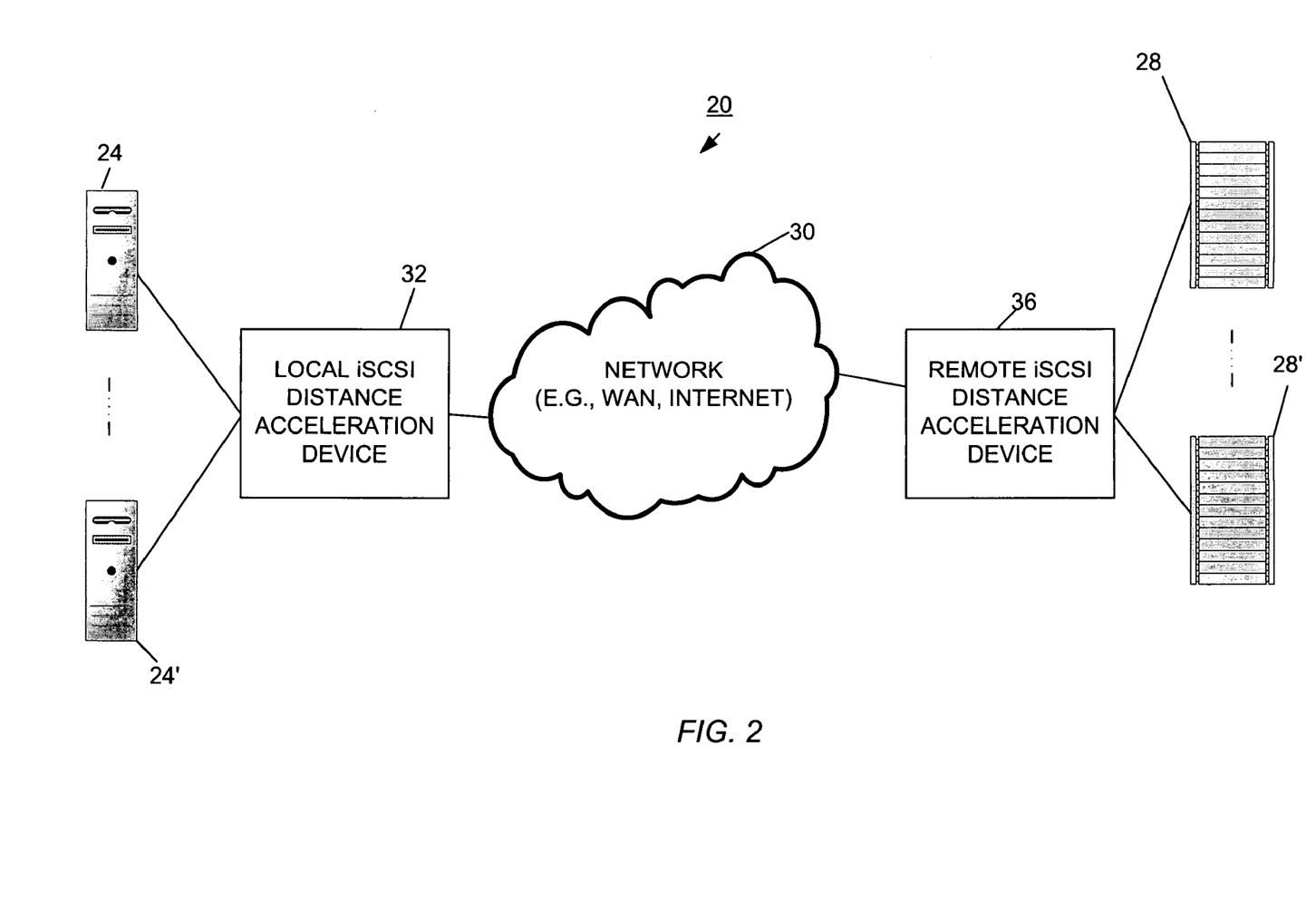
FIG. 2 is a block diagram of an embodiment of a networking environment in which aspects of the invention may be implemented.

FIG. 2 shows an embodiment of a networking environment 20 in which aspects of the invention may be implemented. The networking environment 20 includes a plurality of iSCSI initiators 24, 24' (generally, 24) in communication with a plurality of iSCSI targets 28, 28' (generally, 28) over a network 30. The network 30 can be an Ethernet network (1 Gb Ethernet, 10/100 baseT Ethernet), an Internet Protocol (IP)-based Wide Area Network (WAN), or network of networks, such as the Internet. Physical transport of iSCSI traffic through the network 30 can operate according to the SONET or SDH protocol. In general, the invention can be practiced over any IP-based network, although networks spanning greater geographical distances may experience greater reductions in latency.

In a communication path between the iSCSI initiators 24 and the iSCSI targets 28 are a local iSCSI distance acceleration device 32 and a remote iSCSI distance acceleration device 36. As used herein, the terms local and remote refer to the relatively proximity of the distance acceleration devices with respect to the initiators 24. In addition, the iSCSI designation indicates that each initiator, target, and distance acceleration device supports the iSCSI protocol. Hereafter, this description may omit the modifier "iSCSI" when referring to such devices.

Each initiator 24 is, in general, a server hosting an application. Alternative designations of the initiators 24 include application servers and host computers. Targets 28 include one or more storage devices that reside on the network 30. In addition, targets 28 can be any type of storage device including, for example, a storage array in an IP-based storage area network (IP SAN), a tape library residing on the IP SAN or elsewhere on the network 30, or a disk library that emulates tape drives. Typically, targets 28 are situated at geographically diverse locations with respect to each other and from the initiators 24.

Each distance acceleration device 32, 36 is a network element coupled to the network 30. Examples of network elements that can embody a distance acceleration device include, but are not limited to, customer premises equipment, switches (e.g., and Ethernet switch), bridges, and routers. In one embodiment, each distance acceleration device 32, 36 includes a processor, iSCSI device driver (for implementing an iSCSI protocol stack), a network interface for exchanging TCP/IP-encapsulated iSCSI PDUs with initiators (or targets) and a network interface for exchanging TCP/IP messages with the other distance acceleration device over the network 30, and logic for maintaining track of multiple input/output (10) operations. Instead of, or in cooperation with, a processor, other embodiments can use logic, software, firmware, or any combination of logic, software, and firmware to provide the functionality for generating responses to iSCSI PDUs received from initiators, as described in more detail below. In addition, a single network interface may serve to handle TCP/IP communications with initiators (or targets) and with the other distance acceleration device over the network 30.

During operation, one or more of the initiators 24 establishes an iSCSI session with one of the targets 28. Targets (and distance acceleration devices 32, 36) listen for incoming connections on a well-known TCP port (i.e., 3260). Alternatively, users can configure targets 28 (and distance acceleration devices 32, 36) to listen to a particular TCP port. An iSCSI session between a given initiator and a given target includes a login phase and a full feature phase.

In general, the login phase involves a sequence of requests and responses to establish a TCP connection and an iSCSI session. Optionally, the login phase can operate to authenticate an initiator for accessing a given target. Initiators and targets can also use the login phase to determine various operational parameters according to which these iSCSI devices communicate. Parameters available for negotiation are described in the Request for Comments (RFC): 3720, titled Internet Small Computer Systems (iSCSI), the entirety of which is incorporated by reference herein. Such parameters include: (1) InitialR2T, (2) ImmediateData, (3) MaxConnections, (4) MaxBurstLength, (5) FirstBurstLength, (6) MaxOutstandingR2T, and (7) MaxRevDataSegmentLength. In accordance with the present invention, the local distance acceleration device 32 negotiates and/or exchanges one or more parameters with each initiator 24 and the remote distance acceleration device 36 negotiates and/or exchanges one or more parameters with each target 28 (some parameters may not be negotiated, but are exchanged). Other parameters than those listed herein may be negotiated or exchanged. After the login phase successfully completes, the iSCSI session transitions to the full feature phase.

In brief overview, during the full feature phase the initiator 24 encapsulates SCSI commands and data within iSCSI PDUs and sends the iSCSI PDUs to the target 28 using TCP/IP. Similarly, the target 28 encapsulates SCSI responses within iSCSI PDUs and sends these iSCSI PDUs to the initiator 24 using TCP/IP. In accordance with the present invention, the local distance acceleration device 32 acts as a proxy for the target 28 by receiving and responding to the iSCSI PDUs sent by the initiator 24.

Figure 3:
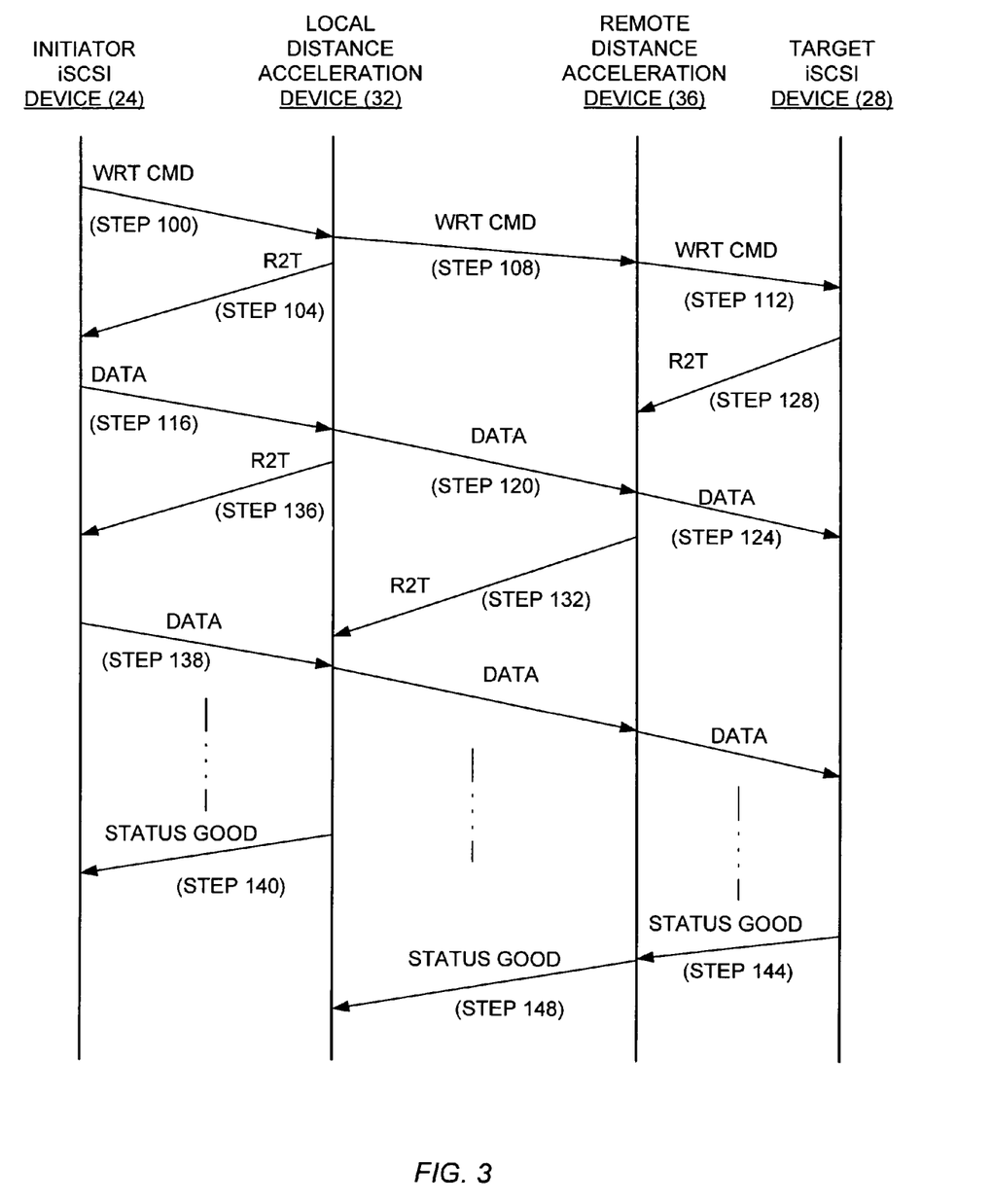
FIG. 3 is a block diagram illustrating an operation of the networking environment of FIG. 2 during a full feature phase of an iSCSI session.

FIG. 3 shows an embodiment of a process for accelerating data transfers between one of the iSCSI initiators 24 and one of the iSCSI targets 28 during the full feature phase of an iSCSI session. In the description of the process, an application executing on the initiator 24 (e.g., a data backup application) issues a request to write data to a storage device. At step 100, the initiator 24 converts the write request into a SCSI write command, encapsulates the SCSI write command, and adds a TCP/IP header for transport over the network 30. The type of storage device (e.g., disk, tape) determines the type of SCSI write command (e.g., write-to-disk, write-to-tape).

At step 104, the local distance acceleration device 32 receives the write command and sends a Ready-to-Transmit (R2T) iSCSI PDU to the initiator 24. The local distance acceleration device 32 also forwards (step 108) the write command to the target 28. The remote distance acceleration device 36 listens for TCP/IP connections to the target, receives the write command from the local distance acceleration device 32, and forwards (step 112) the write command to the target 28.

While the write command proceeds toward the target 28 over the network 30, the initiator 24 should receive the R2T message from the local distance acceleration device 32, thus enabling the initiator 24 to begin transmitting (step 116) data (encapsulated in iSCSI PDUs). The local and remote distance acceleration devices 32, 36 forward (steps 120, 124) the data to the target 28. Data transmission thus begins sooner than what would have occurred otherwise had the initiator 24 needed to wait to receive an R2T message from the target 28. Consequently, the transmission of the R2T message by the distance acceleration device 32 operates to reduce the latency inherent in the delivery of the write command to the target 28 and in the return delivery of the R2T message to the initiator 24.

Upon receiving the write command, the target 28 removes the various levels of encapsulation to retrieve the SCSI write command. The target 28 then responds by issuing (step 128) an R2T iSCSI PDU to the initiator 24. The remote distance acceleration device 36 receives and forwards (steps 132) the R2T PDU to the local distance acceleration device 32. The local distance acceleration device 32 does not forward the R2T PDU to the initiator 24, and may use the R2T PDU to maintain a log of responses from the target 28. The R2T PDU from the target 28 may or may not have arrived at the local distance acceleration device 32 when the local distance acceleration device 32 issues (step 136) another R2T PDU (provided the initiator 24 is going to send more data to the target 28), to enable the initiator 24 to transmit additional data (step 138). The exchange of data and R2T PDUs between the initiator 24 and the local acceleration device 32 continues until the initiator indicates the end of the data transfer.

In one embodiment, the write command is a write-to-tape command. When the initiator 24 indicates that the data transfer is complete, the local distance acceleration device 32 issues (step 140) a status PDU indicating that the target 28 has successfully received the data transmitted by the initiator 24 (although the target has not yet received all of the transmitted data). When the last of the data to be written arrives from the initiator 24, the target 28 issues (step 144) a status PDU indicating that the data transfer is complete. The remote distance acceleration device 36 forwards this status PDU to the local distance acceleration device (step 148), which may add the status PDU to the log of target responses. If, subsequently, the target 28 indicates that an attempt to save the transferred data was unsuccessful (i.e., in response to a write file mark command from the initiator), the target 28 can forward a status message indicating an error, and the initiator 24, upon receiving the error message (forwarded by the local and remote distance acceleration devices), can take appropriate action to recover from the error and to save the data again.

Figure 4:
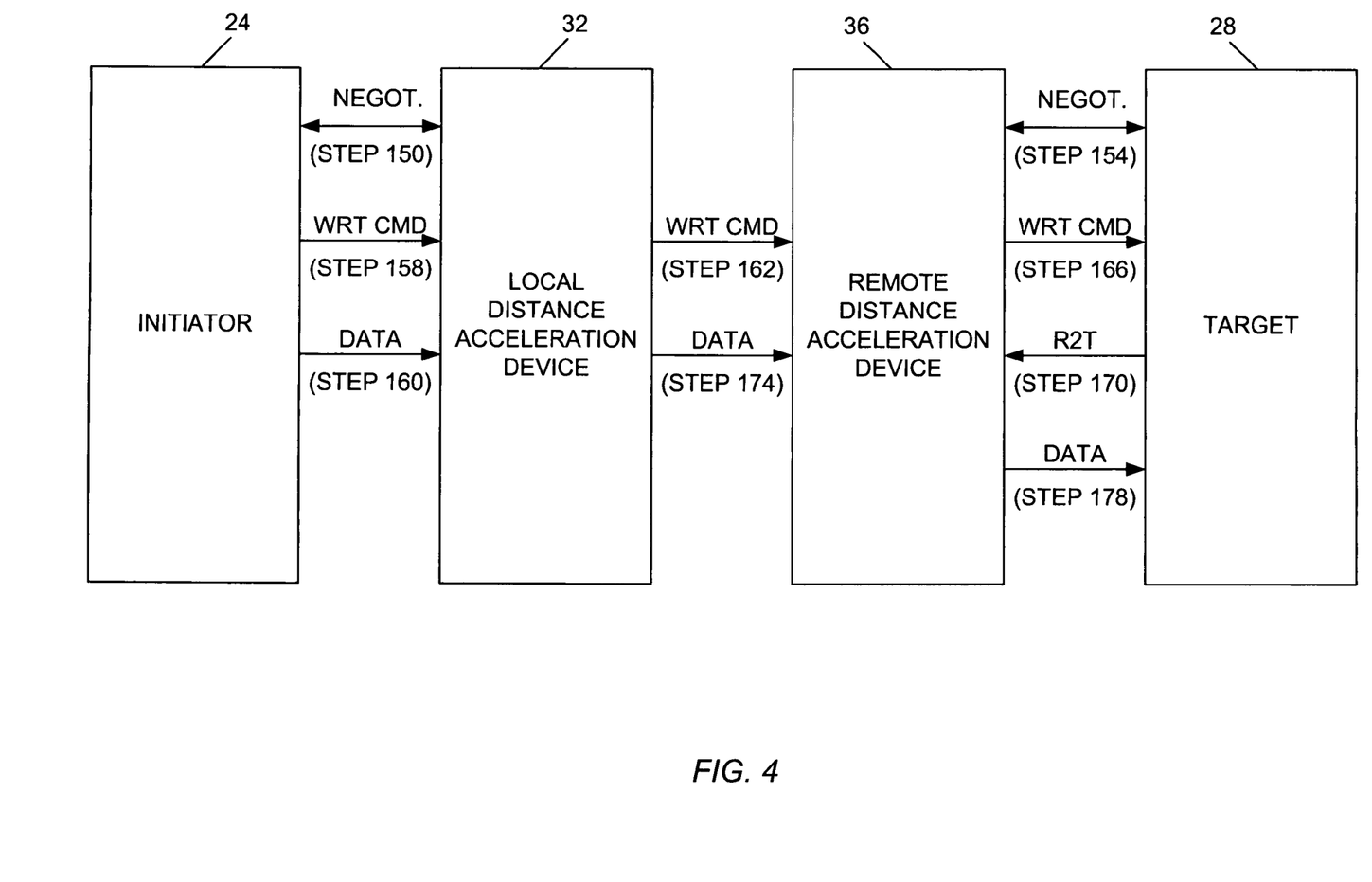
FIG. 4 is a block diagram illustrating an operation of the networking environment of FIG. 2 during login and full feature phases of an iSCSI session.

FIG. 4 illustrates an embodiment of a process for negotiating operational parameters during the login phase of an iSCSI session and for using the negotiated operational parameters during the full feature phase of the iSCSI session. At step 150, one of the initiators 24 sends a request to one of the targets 28 on the network 30 to start negotiating for a given parameter. The local distance acceleration device 32 intercepts the negotiation request and can either accept the negotiated value proposed by the initiator 24, or counter with a different parameter value—e.g., a parameter value known to be acceptable to the intended target 28. The negotiation request from the initiator 24 does not advance beyond the local distance acceleration device 32. In addition, the negotiations between the initiator 24 and the local distance acceleration device 32 can occur for several parameters. Further, the local distance acceleration device 32 can negotiate with each of the plurality of initiators 24.

Similarly, the remote distance acceleration device 36 independently negotiates (step 154) operational parameters with one or more of the targets 28. Because negotiations can occur with a plurality of initiators 24 or with a plurality of targets 28, the local and remote acceleration devices 32, 36 maintain tables for storing the negotiated parameter values and the identities (i.e., addresses) of the initiators and targets.

During the full feature phase, each initiator 24 and each target 28 communicates according to the operational parameters for which it negotiated. Conceivably, an initiator 24 may negotiate a value for an operational parameter that does not match the parameter value negotiated by the target 28 with the remote distance acceleration device 36 for that particular parameter. Notwithstanding, the initiator 24 and target 28 execute data transfers as though there were no mismatch. The local and remote distance acceleration device 32, 36 buffer the iSCSI communications as appropriate, so that the initiator 24 and target 28 appear to communicate with each other without any parameter value mismatch.

For example, consider that the local distance acceleration device 32 and the initiator 24 negotiate such that a R2T message is not required before the initiator 24 can start transferring data to the target 28 after issuing a write command. Further, consider that the target 28 negotiates with the remote distance acceleration device 36 to require an R2T message after receipt of a write command. At step 158, the local distance acceleration device 32 receives a write command from the initiator 24. The initiator 24 can commence sending data (step 160) to the target 28 because, from its perspective, it has negotiated with the target 28 to send data immediately after sending the write command (i.e., without having to wait for a return R2T). Accordingly, the local distance acceleration device 32 forwards (step 162) the write command to the remote distance acceleration device 36 without issuing an R2T message to the initiator 24.

The remote distance acceleration device 36 receives and forwards (step 166) the write command to the target 28. Because the target 28 has negotiated for an R2T message, the target 28 issues (step 170) an R2T message in response to the write command. Before receiving the R2T message from the target 28, however, the remote distance acceleration device 36 may receive (step 174) the data from the initiator 24 (forwarded by the local distance acceleration device 32). The remote distance acceleration device 36 holds the data until it receives the R2T message from the target 28, and then sends (step 178) the data to the target 28. If, instead, the remote distance acceleration device 36 receives the R2T message from the target 28 before receiving the data, the remote distance acceleration device 36 can forward (step 178) the data to the target immediately.

As another example, consider that the local distance acceleration device 32 and the initiator 24 negotiate a 2K byte value for the MaxRecvDataSegmentLength parameter, but that the target 28 negotiates 1K byte value with the remote distance acceleration device 36 for this parameter. (MaxRecvDataSegmentLength defines the maximum data segment length in bytes that an initiator or target can receive in an iSCSI PDU). Accordingly, the initiator 24 is prepared to send data in 2K byte segments, whereas the target is prepared to receive data in 1K byte segments. In one embodiment, the local distance acceleration device 32 forwards each 2K byte segment to the remote distance acceleration device 36, and the remote distance acceleration device 36 buffers and releases the data in 1K byte segments for transmission to the target 28.

In another embodiment, the local and remote distance acceleration devices 32, 36 communicate with each other to exchange the negotiated parameters of the initiators and targets. Such communication can be achieved, for example, with the use of iSCSI commands or with TCP/IP messages. The exchanged information can be stored in the tables, described above. In this embodiment, the local distance acceleration device 32 can determine from its tables that the target 28 permits 1K byte segments only and therefore sends segments of that length to the remote distance acceleration device 36. That is, the local distance acceleration device 32 buffers the extra data rather than the remote distance acceleration device 36.

While the invention has been shown and described with reference to specific preferred embodiments, it should be understood by those skilled in the art that various changes in form and detail may be made therein without departing from the spirit and scope of the invention as defined by the following claims. For example, although the invention has been described with each initiator residing at one end of the network and each target at the opposite end, it is to be understood that initiators and targets can reside at both ends of the network and that each distance acceleration device can operate bi-directionally and serially or concurrently accelerate data transfers between initiators and targets in both directions.

What is claimed is:

1. A Internet Protocol (IP)-based network, comprising:
    an Internet Small Computer Systems Interface (iSCSI) target;
    an iSCSI initiator sending an iSCSI negotiation request to the iSCSI target to start negotiating a value for a given parameter; and
    a local acceleration device in a communication path between the iSCSI initiator and the iSCSI target, the local acceleration device intercepting the iSCSI negotiation request and negotiating the given parameter with the iSCSI initiator in place of the iSCSI target, without forwarding to the iSCSI target any iSCSI negotiation request to negotiate the given parameter; and
    a remote acceleration device, in a communication path between the local acceleration device and the iSCSI target, negotiating a value for the given parameter with the iSCSI target in place of the iSCSI initiator, wherein
    the iSCSI initiator and iSCSI target each transmits iSCSI protocol data units (PDUs) in accordance with the value each separately negotiated for the given parameter, and the local acceleration device comprises:
        means for receiving an iSCSI PDU from the iSCSI initiator and for forwarding the iSCSI PDU to the iSCSI target;
        means for generating a response to the iSCSI PDU that anticipates a response to be generated by the iSCSI target when the iSCSI target receives the iSCSI PDU, the generating means being in communication with the receiving and forwarding means in order to transmit the response generated by the generating means to the iSCSI initiator; and
        means for forwarding the response generated by and received from the iSCSI target to the iSCSI initiator.

2. The network of claim 1, wherein the iSCSI PDU encapsulates a Small Computer Systems Interface (SCSI) write command and the response generated and transmitted to the iSCSI initiator encapsulates a SCSI Ready-to-Transmit message.

3. The network of claim 1, wherein the iSCSI PDU encapsulates data to be written at the iSCSI target, and the response generated and transmitted to the iSCSI initiator encapsulates a SCSI status message indicating a successful writing of the data.

4. The network of claim 1, wherein the iSCSI PDU encapsulates data to be written at the iSCSI target, and the response generated and transmitted to the iSCSI initiator encapsulates a SCSI Ready-to-Transmit message.

5. The network of claim 1, further comprising an iSCSI device driver for negotiating an operational parameter with the iSCSI initiator.

6. A method of accelerating data transfers between an Internet Small Computer Systems Interface (iSCSI) initiator and an iSCSI target over a network, comprising:
    sending, by the iSCSI initiator, an iSCSI negotiation request to the iSCSI target to start negotiating a value for a given parameter;
    intercepting, by a local acceleration device in a communication path between the iSCSI initiator and the iSCSI target, the iSCSI negotiation request and negotiating the given parameter with the iSCSI initiator in place of the iSCSI target, without forwarding to the iSCSI target any iSCSI negotiation request to negotiate the given parameter;
    negotiating, by a remote acceleration device in a communication path between the local acceleration device and the iSCSI target, a value for the given parameter with the iSCSI target in place of the iSCSI initiator;
    transmitting, by the iSCSI initiator and iSCSI target, iSCSI protocol data units (PDUs) in accordance with the value separately negotiated by the iSCSI initiator and iSCSI target for the given parameter;
    receiving an iSCSI PDU by the local acceleration device;
    forwarding, by the local acceleration device, the iSCSI PDU over the network to the iSCSI target;
    generating, by the local acceleration device, a response to the iSCSI PDU that anticipates a response to be generated by the iSCSI target when the iSCSI target receives the iSCSI PDU;
    transmitting the response generated by the local acceleration device to the iSCSI initiator;
    receiving, by the local acceleration device, the response generated by the iSCSI target; and
    forwarding, by the local acceleration device, the iSCSI target's response to the iSCSI initiator.

7. The method of claim 6, wherein the iSCSI PDU encapsulates a Small Computer Systems Interface (SCSI) write command and the response generated by the local acceleration device and transmitted to the iSCSI initiator encapsulates a SCSI Ready-to-Transmit message.

8. The method of claim 6, wherein the iSCSI PDU encapsulates data to be written at the iSCSI target, and the response generated by the local acceleration device and transmitted to the iSCSI initiator encapsulates a SCSI status message.

9. The method of claim 6, wherein the iSCSI PDU encapsulates data to be written, and the response generated by the local acceleration device and transmitted to the iSCSI initiator encapsulates a SCSI Ready-to-Transmit message.

10. A Internet Protocol (IP)-based network, comprising:
    an Internet Small Computer Systems Interface (iSCSI) target;
    an iSCSI initiator sending an iSCSI negotiation request to the iSCSI target to start negotiating a value for a given parameter; and
    a local acceleration device in a communication path between the iSCSI initiator and the iSCSI target, the local acceleration device intercepting the iSCSI negotiation request and negotiating the given parameter with the iSCSI initiator in place of the iSCSI target, without forwarding to the iSCSI target any iSCSI negotiation request to negotiate the given parameter; and
    a remote acceleration device, in a communication path between the local acceleration device and the iSCSI target, negotiating a value for the given parameter with the iSCSI target in place of the iSCSI initiator, wherein
    the iSCSI initiator and iSCSI target each transmits iSCSI protocol data units (PDUs) in accordance with the value each separately negotiated for the given parameter;

the Internet Small Computer Systems Interface (iSCSI) initiator sends an iSCSI protocol data unit (PDU) to the iSCSI target; and the local acceleration device (1) receives and forwards the iSCSI PDU to the iSCSI target, (2) generates a response to the iSCSI PDU that anticipates a response to be generated by the iSCSI target when the iSCSI target receives the iSCSI PDU, (3) transmits the generated response to the iSCSI initiator, "(4) receives the response generated by the iSCSI target from the iSCSI target, and" (5) forwards the response received from the iSCSI target to the iSCSI initiator.

11. The network of claim 10, wherein the iSCSI PDU encapsulates a Small Computer Systems Interface (SCSI) write command and the response generated and transmitted to the iSCSI initiator by the local acceleration device encapsulates a SCSI Ready-to-Transmit message.

12. The network of claim 10, wherein the iSCSI PDU encapsulates data to be written at the iSCSI target, and the response generated and transmitted to the iSCSI initiator by the local acceleration device encapsulates a SCSI status message indicating a successful writing of the data.

13. The network of claim 10, wherein the iSCSI PDU encapsulates data to be written at the iSCSI target, and the response generated and transmitted to the iSCSI initiator by the local acceleration device encapsulates a SCSI Ready-to-Transmit message.

* * * * *